(12) United States Patent
Süss et al.

(10) Patent No.: US 9,376,020 B2
(45) Date of Patent: Jun. 28, 2016

(54) COMBINATION DISPLAY INSTRUMENT IN A VEHICLE

(71) Applicant: Johnson Controls Automotive Electronics GmbH, Remchingen (DE)

(72) Inventors: Manfred Süss, Remchingen (DE); Isabel Hoffmann, Walzbachtal (DE); Gerhard Kammerer, Königsbach (DE); Heinrich Behrends, Bad Herrenalb (DE); Martin Mayer, Sinsheim (DE); Nicolas Mehl, Illkirch-Graffenstaden (FR); Peter Langer, Karlsruhe (DE)

(73) Assignee: Johnson Controls Automotive Electronics GmbH, Remchingen (DE)

( * ) Notice: Subject to any disclaimer, the term of this patent is extended or adjusted under 35 U.S.C. 154(b) by 0 days.

(21) Appl. No.: 14/357,992

(22) PCT Filed: Nov. 14, 2012

(86) PCT No.: PCT/EP2012/072619
§ 371 (c)(1),
(2) Date: May 13, 2014

(87) PCT Pub. No.: WO2013/072366
PCT Pub. Date: May 23, 2013

(65) Prior Publication Data
US 2014/0327536 A1 Nov. 6, 2014

(30) Foreign Application Priority Data
Nov. 14, 2011 (DE) .................... 10 2011 086 269

(51) Int. Cl.
G09G 3/36 (2006.01)
B60K 35/00 (2006.01)
B60K 37/02 (2006.01)

(52) U.S. Cl.
CPC ................. *B60K 35/00* (2013.01); *B60K 37/02* (2013.01); *B60K 2350/1064* (2013.01); *B60K 2350/2082* (2013.01); *B60K 2350/2086* (2013.01); *B60K 2350/402* (2013.01)

(58) Field of Classification Search
CPC .... B60K 35/00; B60K 37/02; B60K 2350/20; B60K 2350/2039; B60K 2350/206; B60K 2350/2082; B60K 2350/1064
USPC ............... 340/461; 345/76, 87, 102; 362/240, 362/249.01, 487–489, 97.1
See application file for complete search history.

(56) References Cited

U.S. PATENT DOCUMENTS 4,789,774 A 12/1988 Koch et al.
5,284,108 A 2/1994 Furuya
(Continued)

FOREIGN PATENT DOCUMENTS

CN 101111879 A 1/2008
DE 26 13 024 A1 9/1977
(Continued)

OTHER PUBLICATIONS

German Office Action in corresponding German Application No. 10 2011 086 269.2.
(Continued)

*Primary Examiner* — Thomas Mullen
(74) *Attorney, Agent, or Firm* — Foley & Lardner LLP

(57) ABSTRACT

A combination display instrument in a vehicle has a plurality of display elements and/or display scales inserted into or attached onto a common base. A polarizing film, which is designed to correspond to the base, is arranged in the line of vision of an observer in front of the base. The polarizing film is held in position on the base in a form-fitting and/or force-fitting manner in an assembled state of the combination display instrument by corresponding molded sections in or on a housing of the combination display instrument.

9 Claims, 1 Drawing Sheet

(56) References Cited

U.S. PATENT DOCUMENTS

| | | | |
|---|---|---|---|
| 8,992,033 B2* | 3/2015 | Suess | 362/19 |
| 2008/0158852 A1 | 7/2008 | Fukushima et al. | |
| 2013/0050822 A1 | 2/2013 | Suss et al. | |

FOREIGN PATENT DOCUMENTS

| DE | 101 10 991 A1 | 11/2002 |
|---|---|---|
| DE | 102010 43 200 A1 | 8/2011 |
| EP | 1 857 994 A1 | 11/2007 |
| EP | 1 873 001 A1 | 1/2008 |
| JP | 61-502561 A | 11/1986 |
| JP | 63-132193 A | 6/1988 |
| JP | 05-010788 A | 1/1993 |
| JP | 06-082275 A | 3/1994 |
| JP | 2008-009432 A | 1/2008 |
| WO | WO-00/70400 A1 | 11/2000 |
| WO | WO-2011/098171 A | 8/2011 |
| WO | WO-2011/098171 A1 | 8/2011 |
| WO | WO-2011/098190 A1 | 8/2011 |

OTHER PUBLICATIONS

International Search Report dated Jul. 23, 2013 in PCT/EP2012/072619.

Office Action dated May 11, 2015, received in corresponding Japanese Application No. 2014-540517 and English translation, 5 pages.

Office Action dated Nov. 18, 2015, received in corresponding Chinese application No. 201280055795.5, and English translation, 12 pages.

* cited by examiner

COMBINATION DISPLAY INSTRUMENT IN A VEHICLE

CROSS REFERENCE TO RELATED APPLICATIONS

The present application is a U.S. National Stage of International Application No. PCT/EP2012/072619 filed on Nov. 14, 2012, which claims the benefit of German Patent Application No. 10 2011 086 269.2 filed on Nov. 14, 2011, the entire disclosures of all of which are incorporated herein by reference.

BACKGROUND OF THE INVENTION

The invention relates to a combination display instrument in a vehicle according to the preamble of claim 1.

WO 00/70400 A1 describes a multilayer liquid crystal display.

SUMMARY OF THE INVENTION

The object of the invention is to specify an improved combination display instrument in a vehicle.

Regarding the combination display instrument, the object is achieved according to the invention by a combination display instrument in a vehicle with the features of claim 1.

Preferred embodiments and developments of the invention are given in the dependent claims.

With the combination display instrument in a vehicle, in which a plurality of display elements and/or display scales are mounted in or on a common supporting plate, wherein a polarizing film designed to correspond to the supporting plate is disposed in front of the supporting plate in the viewing direction of an observer, the polarizing film according to the invention in an assembled state of the combination display instrument is held in its position by shape locking and/or force fit by means of suitable moldings in or on a housing of the combination display instrument. By the arrangement of a polarizing film in front of the supporting plate the transmission of electromagnetic radiation, i.e. of visible light, generated behind the supporting plate is increased, wherein the reflection caused by a display element and/or display scale itself is advantageously substantially excluded. Moreover, by means of the polarizing film it is prevented or at least reduced that an observer of the display element and/or display scale perceives the contours thereof in a deactivated, i.e. non-illuminated, state of the combination display instrument.

Furthermore, by the adhesive-free arrangement of the polarizing film on the supporting plate a transmittance of the arrangement is significantly increased, so that a light intensity of the light source and a consumption of electrical energy resulting therefrom for its operation can be reduced.

In a further embodiment the polarizing film is directly joined to the supporting plate 1 by material bonding by adhesion of the polarizing film 7 itself (also briefly referred to as bonding) without additional connecting means. Heat is applied when applying the polarizing film, causing partial melting and adhesion of at least one layer of the polarizing film on the supporting plate and thus causing joining together (also briefly referred to as thermo-compression bonding).

In a preferred embodiment the polarizing film is a circular polarizing film, by means of which e.g. it is prevented that light incident from the exterior onto the display element and/or scale is reflected back. The polarizing film itself is in the form of a laminated element, wherein a plurality of layers disposed one above the other are joined together by material bonding, in particular they are glued together.

In an advantageous embodiment variant the polarizing film covers the supporting plate at least in segments, preferably in the region of display elements and/or display scales.

In a particularly advantageous embodiment variant the supporting plate and the polarizing film comprise substantially identical dimensions, so that all display elements and/or display scales disposed on, at or in the supporting plate are covered by the polarizing film. The reflection that e.g. can be caused by illumination of the display elements and/or display scales is thereby prevented or at least reduced for the entire area of the supporting plate.

In a further advantageous embodiment variant the polarizing film lies flat on the supporting plate over its entire area, so that a surface of the supporting plate is protected against environmental influences, e.g. dust.

The display elements and/or display scales are preferably inserted as transparent or semi-transparent segments in the otherwise opaque supporting plate. The display elements and/or display scales can thereby be simply illuminated by means of a light source disposed behind the supporting plate.

In an advantageous alternative embodiment variant, the supporting plate consists of a transparent or semi-transparent material that is printed or coated in segments with an opaque material layer while forming the display elements and/or display scales.

The display elements and/or display scales are back lit in the supporting plate by means of at least one light source in an activated state of the combination display instrument.

The polarizing film is preferably disposed and oriented such that in a deactivated state of the combination display instrument the display elements and/or display scales in the supporting plate are not visible to an observer. If the display elements and/or display scales of the combination display instrument are not illuminated, they are not visible as a result of the polarizing film, because the polarizing film prevents ambient light reflected by the display elements and/or display scales from being visible to an observer. The combination display instrument thereby appears as homogeneously black until the illumination of the display elements and/or display scales is turned on and the display elements and/or display scales can thus be seen. This effect is also referred to as the black panel effect.

BRIEF DESCRIPTION OF THE DRAWINGS

Exemplary embodiments of the invention are explained in detail below using figures.

In the figures.

Mutually corresponding parts are provided with the same reference characters in all figures.

DETAILED DESCRIPTION OF THE PREFERRED EMBODIMENT(S)

Figure 1:
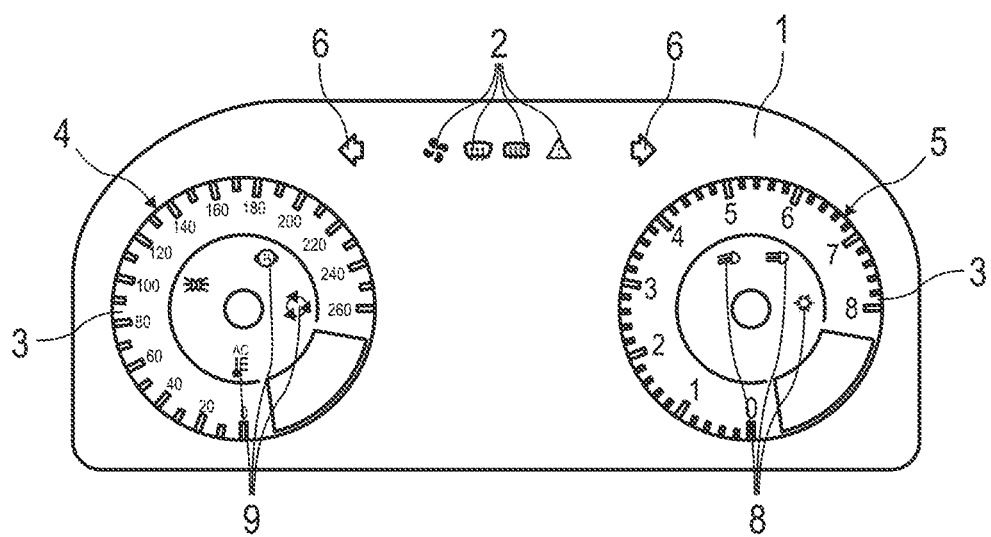
FIG. 1 shows schematically a view of a supporting plate of a combination display instrument for a vehicle.

FIG. 1 shows schematically a view of a supporting plate 1 of a combination display instrument, which is not shown in detail, for a vehicle.

In order to form a combination display instrument, a plurality of individual display elements 2 and/or display scales 3 are directly inserted into a supporting plate 1 or disposed on the supporting plate 1. Furthermore, at least one not illustrated aperture can be disposed in the supporting plate 1, which is formed to correspond to a display screen, which can thus be part of the combination display instrument and is disposed in the region of the aperture. Such a display screen is preferably in the form of a conventional liquid crystal screen or as a conventional liquid crystal display.

Parameters, control and/or regulating variables and warning messages that are relevant to the operation of the vehicle and/or the operation of a vehicle assistance system and/or of an entertainment system can be displayed on the display elements 2 and/or display scales 3 as well as the display screen in a conventional manner.

The geometric shape, the number and the arrangement of the display elements 2 and/or display scales 3 can thereby be variably disposed in the supporting plate 1 and thus can be simply adapted to the requirements in different combination display instruments.

The display scales 3 are preferably of partially circular form and are disposed at the edge of the supporting plate 1 and thus of the combination display instrument. The display scales 3 are thereby in the form of an analogue display element of a conventional speedometer 4 and as an analogue display element of a conventional tachometer 5 in the illustrated embodiment variant. A not illustrated pointer element that is associated with each display scales 3 is moved along the respective display scale 3 depending on a value to be illustrated or indicated, so that a current value of a measurement variable, that is e.g. the speed of the vehicle, can be read on the display scale 3 of the combination display instrument using the pivoting movement of the pointer element along the display scale 3 about a pointer axle and an angular position of the pointer element resulting therefrom.

A single display scale 3 can be disposed or inserted on, at or in the supporting plate 1 in alternative, not illustrated embodiment variants of the combination display instrument, wherein said display scale 3 is preferably of semicircular form.

The display elements 2 are e.g. in the form of conventional indicator lights 6 for a directional pointer, which flashes when the directional pointer is operated.

Furthermore, the display elements 2 can be in the form of conventional graphical symbols 8 or warning characters 9, which are illuminated in corresponding situations and warn and/or inform the user of the vehicle.

Figure 2:
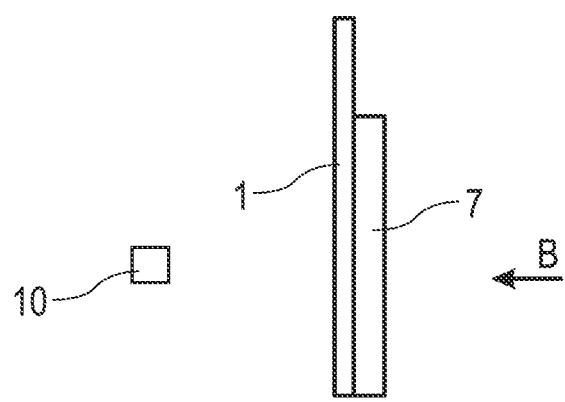
FIG. 2 shows schematically a lateral view of a supporting plate with a polarizing film disposed thereon and FIG. 3 shows schematically an exploded representation of the supporting plate and polarizing film.

A lateral view of the supporting plate 1 with a polarizing film 7 disposed thereon is schematically illustrated in FIG. 2. Such a polarizing film 7 is preferably in the form of a circular polarizing film, by means of which e.g. ambient light incident from the exterior on display elements 2 and/or display scale 3 is prevented from being reflected back. The polarizing film 7 itself is in the form of a laminated element in one possible embodiment. For this purpose, a plurality of layers that are disposed one above the other are joined together by material bonding, especially glued together.

The polarizing film 7 is thereby disposed in front of the supporting plate 1 in the viewing direction B of an observer and is shaped to correspond to the supporting plate 1.

The polarizing film 7 is held in its position without adhesive, e.g. by means of suitable moldings in or on a housing of the combination display instrument in an assembled state of the same by form fit and/or by force fit. By means of said arrangement of the polarizing film 7 on the supporting plate 1 without adhesive, the transmittance of the arrangement is significantly increased so that the light intensity of the light source and the consumption of electrical energy for its operation resulting therefrom can be reduced.

Additionally or alternatively, the polarizing film 7 can be directly applied to the supporting plate 1, e.g. a glass surface of a display, and can be joined to the same by material bonding. In a possible embodiment the polarizing film 7 is directly joined to the supporting plate 1 without additional joining means by material bonding through adhesion of the polarizing film 7 itself (also briefly referred to as bonded). When applying the polarizing film 7, heat is applied so that partial melting and adhesion of at least one layer of the polarizing film 7 on the supporting plate 1, and thus joining together, is caused.

Alternatively or additionally, the polarizing film 7 can be attached to the supporting plate 1 by means of a transparent adhesive. In a further embodiment the polarizing film 7 can be fixed in a frame by material bonding, especially glued.

In a first embodiment variant the polarizing film 7 covers the supporting plate 1 at least in segments, preferably in the region of display elements 2 and/or display scales 3.

In a particularly advantageous embodiment variant, the supporting plate 1 and the polarizing film 7 comprise essentially identical dimensions, so that all display elements 2 and/or display scales 3 disposed on, at or in the supporting plate 1 are covered by the polarizing film 7. The reflection, which e.g. can be caused by illumination of the display elements 2 and/or display scales 3, is thereby prevented or at least reduced for the entire area of the supporting plate 1.

In a further advantageous embodiment variant, the polarizing film 7 lies flat on the supporting plate 1 over its entire area, so that a surface of the supporting plate 1 is protected against environmental influences, e.g. dust.

The supporting plate 1 is made of a conventional plastic or a plastic mixture.

The display elements 2 and/or display scales 3 are thereby inserted in the otherwise opaque supporting plate 1 as transparent or semi-transparent segments in a first embodiment variant. The display elements 2 and/or display scales 3 can thereby be simply illuminated by means of a light source 10 disposed behind the supporting plate 1.

In an alternative embodiment variant the supporting plate 1 consists of a transparent or semi-transparent material, which e.g. can be colored to generate a colored illumination. The supporting plate 1 is printed or coated with an opaque material layer in segments in a conventional manner, wherein the display elements 2 and/or display scales 3 are thus formed by the uncoated segments.

The display elements 2 and/or display scales 3 are back lit in the supporting plate 1 in a conventional manner by means of at least one light source in an activated state of the combination display instrument.

The polarizing film 7 is preferably disposed and oriented such that in a deactivated state of the combination display instrument the display elements 2 and/or display scales 3 in the supporting plate 1 are not visible to an observer. If the display elements 2 and/or display scales 3 of the combination display instrument are not illuminated, they are not visible because of the polarizing film 7 and its orientation, because the polarizing film 7 prevents ambient light reflected by the display elements 2 and/or display scales 3 from being visible to an observer. The combination display instrument thereby appears to be homogeneously black until the illumination of the display elements 2 and/or display scales 3 is turned on and the display elements 2 and/or display scales 3 are visible because of the back lighting. This effect is also referred to as the black panel effect.

Figure 3:
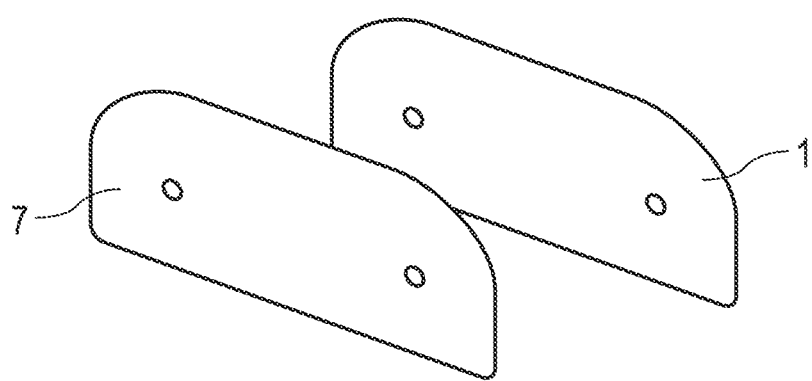

FIG. 3 shows schematically an exploded representation of the supporting plate 1 and the polarizing film 7.

The unilluminated display elements 2 and/or display scales 3 are not visible behind the polarizing film 7, because the polarizing film 7 prevents ambient light reflected by the display elements 2 and/or display scales 3 from being perceived by an observer.

REFERENCE CHARACTER LIST 1 supporting plate
2 display element
3 display scale
4 speedometer
5 tachometer
6 indicator lights
7 polarizing film
8 graphical symbols
9 warning characters
B viewing direction

The invention claimed is:

1. A combination display instrument for a vehicle, comprising:
    a common supporting plate, wherein the common supporting plate is formed as
    one of (i) an opaque supporting plate with transparent or semi-transparent segments, or (ii) a transparent or semi-transparent plate with opaque segments and transparent or semi-transparent segments;
    a plurality of display elements and/or display scales directly contained within the common supporting plate, wherein the display elements and/or the display scales are formed by the transparent or semi-transparent segments of the supporting plate; and
    a polarizing film shaped to correspond to the supporting plate and disposed in front of the supporting plate in the viewing direction of an observer,
    wherein the polarizing film is held in its position on the supporting plate by form fit and/or force fit by moldings in or on a housing of the combination display instrument in an assembled state of the same and wherein the polarizing film directly lies flat on the supporting plate over its entire area and is arranged, adhesive-free, on the supporting plate.

2. The combination display instrument as claimed in claim 1, wherein the polarizing film is a circularly polarized film.

3. The combination display instrument as claimed in claim 1 wherein the polarizing film covers the supporting plate at least in segments.

4. The combination display instrument as claimed in claim 1, wherein the supporting plate and the polarizing film comprise essentially identical dimensions.

5. The combination display instrument as claimed in claim 1, wherein the polarizing film lies flat on the supporting plate over its entire area.

6. The combination display instrument as claimed in claim 1, wherein the display elements and/or display scales in or on the supporting plate are back lit in an activated state of the combination display instrument by at least one light source.

7. The combination display instrument as claimed in claim 1, wherein the polarizing film is disposed and oriented such that in a deactivated state of the combination display instrument, the display elements and/or display scales in or on the supporting plate are not visible to an observer.

8. The combination display instrument as claimed in claim 1, wherein the polarizing film is directly joined to the supporting plate by heat applied to the polarizing film.

9. The combination display instrument as claimed in claim 8, wherein the heat applied causes the polarizing film to join to a glass surface of the supporting plate.

* * * * *